*Schultz & Warker,*
*Soda Fountain.*
Nº 43,798.   Patented Aug. 9, 1864.
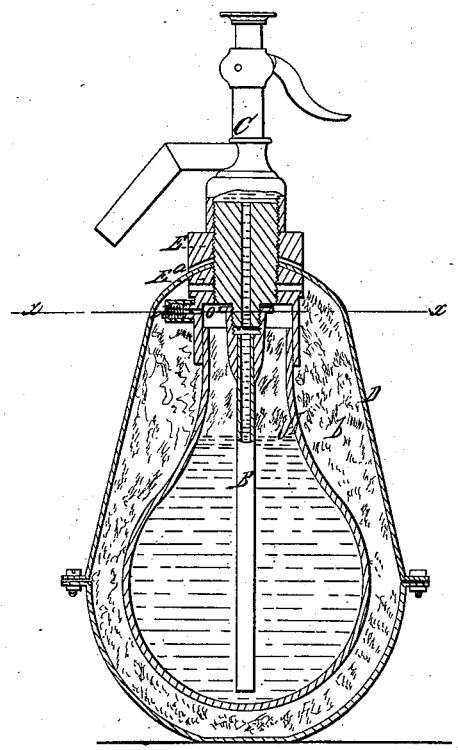
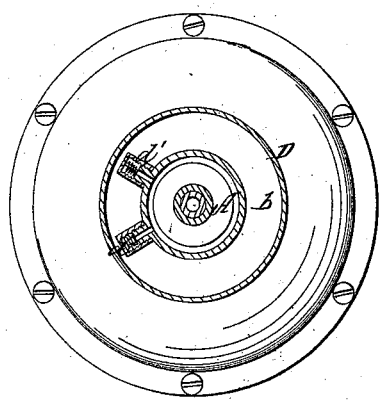
Witnesses:
Inventor:
Carl Schultz
Thomas Warker

UNITED STATES PATENT OFFICE.

CARL SCHULTZ AND THOMAS WARKER, OF NEW YORK, N. Y.

IMPROVEMENT IN SODA-FOUNTAINS.

Specification forming part of Letters Patent No. 43,798, dated August 9, 1864; antedated July 28, 1864.

*To all whom it may concern:*

Be it known that we, CARL SCHULTZ and THOMAS WARKER, both of the city, county, and State of New York, have invented a new and useful Improvement in Soda-Fountains; and we do hereby declare that the following is a full, clear, and exact description of the same, reference being had to the accompanying drawings, making a part of this specification, in which—

Figure 1 represents a vertical central section of our invention. Fig. 2 is a horizontal section of the same, the line $x\,x$, Fig. 1, indicating the plane of section.

Similar letters of reference in both views indicate corresponding parts.

The object of this invention is to avoid the injurious or deleterious effects arising from the use of metallic soda-fountains, and to arrange the same so that the mineral water is not permitted to come in contact with any other substance or material but glass.

The invention consists in surrounding the vessel in which the mineral water is kept with an atmosphere the pressure of which is equal to that of the carbonic acid gas contained in said vessel, in su h a manner that the use of a glass vessel of a ly desirab'e size is rendered practicable, and the danger of bursting said vessel by an overcharge is entirely avoided.

The invention consists, also, in the application of an inlet and outlet valve to the vessel containing the soda-water, said valves being so arranged that they form a communication between the interior of the vessel or fountain and the surrounding atmosphere, and that the pressure of the gas in the interior of the fountain and that of the surrounding atmosphere will equalize themselves automatically.

To enable others skilled in the art to make and use our invention, we will proceed to describe it.

A represents a vessel of glass, china, porcelain, or other material capable of resisting the effects of carbonic-acid water, and of such salts or chemicals which are usually contained in those liquids, known by the general term of "mineral water." This vessel is provided with a tube, B, leading down near to its bottom, and a head, $l$, is fitted on its top to draw off its contents. This head may be made of any desired construction, and attached to the vessel in any desirable manner.

D is a shell of sheet-copper, cast-iron, or other suitable material, of sufficient strength to resist the pressure to which it will be exposed. This shell is secured to the neck of the vessel A, by means of two jam-nuts, E E', and suitable packing rings, $a\;a'$, so that a perfectly air or gas tight joint is formed between the two, and that the vessel A is completely surrounded by the shell D. The space $b$, between the vessel A and shell D, is filled with carbonic-acid gas, of the same pressure as that contained in the vessel itself, and said vessel is thus surrounded by an atmosphere of a pressure equal to that of the gas in its interior, and consequently it is not subjected to any strain greater than that which it has to sustain when filled with water in the open atmosphere, whatever the pressure of the gas in its interior and that of the surrounding atmosphere. Said vessel can therefore be made of glass, porcelain, china, stoneware, or any other material capable of resisting the effects of the soda-water, and of any desirable size, without incurring the danger of an explosion, provided the shell D is made strong enough for the occasion, and the use of a soda-fountain of glass—a desideratum so long and vainly sought after—is rendered practicable. The vessel $a$ is provided with two valves, $d\;d'$, which form a communication between the space $b$ and the interior of said vessel. The valve $d$ opens inward and the valve $d'$ outward, and if the pressure in the interior of the vessel exceeds that of the surrounding atmosphere the gas from the inside forces open the valve $d'$, and the pressure equalizes itself automatically, and if the pressure on the interior of the vessel should be diminished the gas from the surrounding atmosphere rushes in through the valve $d$, and the pressure is again equalized. The gas in the space $b$ will thus assist in keeping up the life of the contents of the vessel, and in charging the vessel the atmosphere in the space $b$ will form itself and attain the desired pressure by the gas escaping through the valve $d'$.

If desired, the space $b$ may be filled out with sawdust, sand, or other similar material, to prevent the vessel A from swaying to and fro, in case the fountain is carried in a horizontal position.

What we claim as new, and desire to secure by Letters Patent, is—

1. Surrounding the soda-fountain A with an atmosphere of a pressure equal to that of the gas contained in the said fountain, substantially in the manner and for the purpose described.

2. The inlet and outlet valves $d\ d'$, in combination with the vessel A and shell D, constructed and operating in the manner and for the purpose substantially as specified.

CARL SCHULTZ.
THOMAS WARKER.

Witnesses:
W. HAUFF,
JAS. R. MASON.